United States Patent [19]

Leonard

[11] Patent Number: 4,637,474

[45] Date of Patent: Jan. 20, 1987

[54] TRACTOR AND TOWED IMPLEMENT WITH ELEVATION CONTROL SYSTEM FOR IMPLEMENT INCLUDING PRESSURE RESPONSIVE VALVE ACTUATOR

[76] Inventor: Willie B. Leonard, 5902 Royalton, Houston, Tex. 77081

[21] Appl. No.: 566,755

[22] Filed: Dec. 29, 1983

Related U.S. Application Data

[63] Continuation-in-part of Ser. No. 232,868, Feb. 9, 1981, abandoned, and a continuation-in-part of Ser. No. 33,036, Apr. 29, 1979, Pat. No. 4,355,506, said Ser. No. 232,868, is a continuation-in-part of Ser. No. 828,045, Aug. 26, 1977, Pat. No. 4,227,440, which is a continuation-in-part of Ser. No. 772,560, Feb. 28, 1977, abandoned, which is a continuation-in-part of Ser. No. 622,760, Oct. 15, 1975, Pat. No. 4,094,229, which is a continuation-in-part of Ser. No. 521,036, Nov. 5, 1974, Pat. No. 4,046,059, which is a continuation-in-part of Ser. No. 489,829, Jul. 18, 1974, Pat. No. 3,988,966.

[51] Int. Cl.[4] .............. A01B 63/112

[52] U.S. Cl. .............. 172/7; 91/388; 172/413

[58] Field of Search .............. 172/2, 3, 7, 9, 10, 172/12, 260.5, 413, 465, 491; 91/388; 280/405 B, 446 A, 43.23; 180/14.5; 137/625.63

[56] References Cited

U.S. PATENT DOCUMENTS

| | | | |
|---|---|---|---|
| 2,989,950 | 6/1961 | Lockman | 91/388 |
| 3,211,182 | 10/1965 | Gyurik et al. | 137/625.63 X |
| 3,627,053 | 12/1971 | Hook et al. | 172/9 |
| 3,670,822 | 6/1972 | Reinhardt | 172/7 |
| 3,988,966 | 11/1976 | Leonard | 91/388 |
| 4,077,475 | 3/1978 | Hino et al. | 172/3 |
| 4,254,689 | 3/1981 | Leonard | 91/388 |
| 4,265,331 | 5/1981 | Leonard | 91/388 X |

*Primary Examiner*—Richard T. Stouffer
*Attorney, Agent, or Firm*—Murray Robinson; Ned L. Conley; David A. Rose

[57] ABSTRACT

The elevation of a tool carried by an implement towed by a tractor is determined by a hydraulic motor mounted on the implement adjusting the wheel height. A servo valve mounted on the tractor responsive to line pressure controls the hydraulic motor. An operator actuated vent valve mounted on the tractor vents line pressure to control the servo valve. A tool elevation responsive feedback vent valve mounted on the implement increasingly vents line pressure as the hydraulic motor changes tool elevation, to negate the effect of venting by the operator actuated vent valve. When hydraulic motor movement equals movement of the operator actuated vent valve, the feedback venting equals that of the operator actuated bent valve. A second negative feedback on the servo motor pistons then returns the servo valve to neutral closed position and change in tool elevation stops. A load sensor in the connection between the tractor and towed implement responds to tension in excess of an adjustable pressure determined tension to raise the tool until the tension drops, whereupon the tool level returns to its initial level. The direction of the tool may also be varied in response to the speed of the tractor motor.

27 Claims, 5 Drawing Figures

821
815
825
823
819
817
813
R
857
855
859
851
812
853
829
819
821
827
825
811
817
815
94
93
R
269
267
63
67
221
233
225
224
231
227
219
98
65
61
51
395
701
503
703
622
608
616
610
502
501
618
612
614
620
624
606
560
559
663
667
664
553
657
673
517
504
543
513
505
509
507
500
R
511
391
515
541
558
557
665
661
666
555
653
671
415
711
725
710
719
730
707
706
721
712
713
705
127
331
P
329
115
305
303
R

TRACTOR AND TOWED IMPLEMENT WITH ELEVATION CONTROL SYSTEM FOR IMPLEMENT INCLUDING PRESSURE RESPONSIVE VALVE ACTUATOR

CROSS REFERENCES TO RELATED APPLICATIONS

Ser. No. 232,868

(1) This application is a continuation-in-part of prior application Ser. No. 232,868 filed Feb. 9, 1981, now abandoned.

U.S. Pat. No. 4,227,440

(2) Ser. No. 232,868 is a continuation-in-part of application Ser. No. 828,045 filed Aug. 26, 1977, now U.S. Pat. No. 4,227,440 issued Oct. 14, 1980, the disclosure of which is incorporated herein by reference.

U.S. Pat. Nos. 4,335,645 and 4,004,897

(3) Ser. No. 828,045 is a continuation-in-part of application Ser. No. 772,560 filed Feb. 28, 1977, abandoned in favor of applications:

(a) Ser. No. 962,858, filed Nov. 22, 1978, now U.S. Pat. No. 4,335,645, issued June 22, 1984, and (b) Ser. No. 27,668 filed Apr. 6, 1979, now U.S. Pat. No. 4,004,897 issued Sept. 20, 1983.

U.S. Pat. Nos. 4,094,229; 4,265,331; 4,283,990

(4) Ser. No. 772,560 was a continuation-in-part of (a) application Ser. No. 622,760, filed Oct. 15, 1975, now U.S. Pat. No. 4,094,229, issued June 13, 1978, divisions of which are:

(b) application Ser. No. 872,826 filed July 27, 1978, now U.S. Pat. No. 4,265,331, issued May 5, 1981, and (c) application Ser. No. 62,694, filed Aug. 12, 1979, now U.S. Pat. No. 4,283,990 issued Aug. 18, 1981.

U.S. Pat. Nos. 4,046,059; 4,152,971

(5) Ser. No. 622,760 is a continuation-in-part of (a) application Ser. No. 521,036, filed Nov. 5, 1974, now U.S. Pat. No. 4,046,059, issued Sept. 6, 1977, a division of which is (b) application Ser. No. 720,420, filed Sept. 3, 1976, now U.S. Pat. No. 4,152,971, issued May 8, 1979.

U.S. Pat. Nos. 3,988,966; 4,137,825; 4,254,689

(6) Ser. No. 521,036 a continuation-in-part of (a) application Ser. No. 489,829 filed July 18, 1974, now U.S. Pat. No. 3,988,966 issued Nov. 2, 1976, divisions of which are:

(b) application Ser. No. 720,410 filed Sept. 3, 1976, now U.S. Pat. No. 4,137,825, issued Feb. 6, 1979, and (c) application Ser. No. 931,322 filed Aug. 7, 1978, now U.S. Pat. No. 4,254,689, issued Mar. 10, 1981.

U.S. Pat. No. 4,355,506

(7) This application is also a continuation-in-part of application Ser. No. 33,036 filed Apr. 29, 1979, now U.S. Pat. No. 4,355,506 issued Oct. 26, 1982, the disclosure of which is incorporated herein by reference.

The relationship of the prior patents to the present application may be summarized briefly as follows:

A. Original Disclosure. (Fluidic Repeater)

U.S. Pat. Nos. 3,988,966; 4,137,825; and 4,254,689 have the same disclosure.

U.S. Pat. Nos. 4,046,059 and 4,152,971 are based on a single disclosure which differs from that of the above three patents in details relative to FIGS. 30 and 31.

These five patents all relate to fluidic repeaters, one-line or two-line, venting or throttling, with specific transmitter constructions (U.S. Pat. No. 3,988,966).

B. Second Disclosure (applications)

U.S. Pat. Nos. 4,094,229; 4,283,990; and 4,265,331 are based on a common disclosure which includes the original disclosure plus added disclosure relating to new FIGS. 32-51.

Included in the added disclosure are exemplifications of particular applications of the fluidic repeater as follows:

FIGS. 38, 39. Apparatus for Loading a Floating Vessel By a Crane Located on a Pier.

FIGS. 10, 41. Swash Plate Control

FIG. 42. Seismic Generator

FIG. 43. Four Wheel Drive Steering Note also the reference in column 1, line 19 to "plow jerkers".

The claims of the above three patents differ in that the first relates to dual load cylinders, e.g. for driving a swash plate; the second relates to one line venting; the third relates to a seismic generator.

C. Third Disclosure (Two Line/OneLine; Rotary)

U.S. Pat. Nos. 4,335,645 and 4,004,897 are based on a like disclosure which includes the first and second above listed disclosures plus the further disclosures of FIGS. 52-55 which relate to systems for venting, e.g. one line at a time of a two line system, to rotary transmitters, to swash plate drives, and to four wheel vehicles.

The claims of U.S. Pat. No. 4,335,643 relate to venting systems employing rotary transmitters. Claim 18 refers also to a rotary feedback and load. (Compare FIGS. 30, 36, 45, 46, 46A, 47, 51, 52, 52A, 53, 54).

The claims of U.S. Pat. No. 4,004,897 relate to employing two lines which are vented one at a time.

D. Fourth Disclosure (Line Balance)

U.S. Pat. No. 4,227,440 includes disclosures A, B, and C and adds the disclosure of FIGS. 56-65 relating to arrangements for balancing the line drops or resistances, e.g. in a case where the transmitter and responder are located at different distances from the source of pressure fluid.

E. Fifth Disclosure

Applicant's U.S. Pat. No. 4,355,506 incorporates by reference disclosures A and B and adds the disclosure of new FIGS. 1-4 relating to rotary transmitters and swash plate drive. Claims relate to travel limit means for the responder, e.g. power limit means for restricting power transmitted from pump to motor.

It will be noted that by incorporating herein by reference the disclosure of U.S. Pat. No. 4,227,440, the groups A, B, C. D disclosures are incorporated herein, and that by incorporating by reference the disclosure of U.S. Pat. No. 4,355,506 the group E disclosure is incorporated herein.

BACKGROUND OF THE INVENTION

This invention relates to remote manual and automatic hydraulic control systems and more particularly to such a system for controlling the elevation (height or depth) of a towed implement, such as a disc plow or a hay conditioner, for example, either manually from the tractor cab and/or automatically in response to the drawbar tension.

Heretofore the elevation of such implements has been set by a hydraulic cylinder which raises or lowers the wheels of the towed implement relative to its frame, thereby to raise and lower the implement relative to the wheels. The operator opens a valve supplying hydraulic fluid to the cylinder and leaves the valve open until the desired elevation adjustment is achieved; then the operator closes the valve. To change the elevation in the opposite direction a bleed valve is opened until the desired height is achieved, then the operator closes the bleed valve. Such setting of the elevation is imprecise and not accurately repeatable. Everytime the operator has to raise the towed implement, e.g. for crossing a road, travelling down the road to another field, crossing a ditch, or passing over a log or other impediment and then has to lower the implement to a working elevation, the working elevation will be a little different. If the towed implement hits an impediment such as a stump, rock or hard place, the resulting increase in drawbar tension may break the drawbar.

The purpose of the present invention is to provide the operator with precise, repeatable control of the working height or depth of towed implements such as disc plows, hay conditioners and others, where it is necessary to go from a transport height to a working height quickly and reliably. This is done remotely in the cab by the operator. A lever control with a graduated scale allows the operator to place the implement at the desired height or depth. No mechanical stops are needed on the implement. The height or depth is changed by simply moving the lever to another position. A feature of the invention is automatic working height or depth control as related to drawbar pull.

SUMMARY OF THE INVENTION

As with many implements of this type, the elevation of the implement is set by a hydraulic cylinder which raises or lowers the wheels. In this system, the cylinder is controlled by a servo valve which directs fluid to the appropriate end of the cylinder.

This servo valve is in turn controlled by a feedback circuit which consists of an operator valve in the cab of the tractor and a draft feedback attached to the plow frame.

Both the operator valve and the feedback valve are identical in construction. Each has a rotor which is turned, in one case, by the operator's lever and, in the other, by the mechanical linkage to the hydraulic cylinder. This rotor has a cam surface which is exposed to two ports in the valve. As the rotor is turned, one of the ports is closed off while the other has the cam surface moving away from it, allowing a progressively greater amount of flow through this port as the angle of rotation increases. Flow then passes over the cam and out a return port which carries it back to the reservoir.

The servo valve is connected to the tractor hydraulic system. It uses the system pressure to operate the height control cylinder and, by means of two precision orifices, to establish two equal flow control circuits.

These two circuits are applied to the tow ports of the aforementioned valves and to the ends of the spool in the servo valve.

If the operator valve handle is moved, one circuit is closed off while the other is vented to the reservoir. The amount of venting is dependent on the deflection of the valve handle. This venting causes a drop in pressure as compared to the other circuit. This pressure differential is reflected to the servo valve, where the spool is moved away from the higher pressure side.

This action causes the servo valve to direct fluid to the appropriate side of the hydraulic cylinder, which then raises or lowers the implement as originally directed by the operator.

The feedback valve rotor is then turned as the implement moves up or down. Its connection to the control circuit is such that the opposite circuit from the one being vented in the cab now will vent as the implement moves. The movement will continue until the rotor is turned the same amount as was turned in the cab.

At this point, the venting of both control circuits is identical so that the spool in the servo valve is pushed back to a center position.

Grooves in the spool ends insure that an equal pressure applied to each end of the spool will cause the spool to center. In the center position, the working ports of the servo valve are all blocked and the movement of the elevation control cylinder is stopped.

The optional automatic draft control consists of two components: an adjustable limit control in the cab and a drawbar mounted load sensor. This feature would be applicable to towed disc plows.

The adjustable limit control is a hydraulic pressure reducing valve. This valve takes system pressure and lowers it to a level pre-selected by the operator.

Lowered pressure from this valve is directed to a special hydraulic cylinder mounted on the drawbar. One end of the cylinder, or load sensor, is firmly attached to the plow while the rod end is mechanically attached to the drawbar by such means that the load imposed on the drawbar is reflected to the load sensor.

The load sensor has a piston within a cylinder to which the pressure from the adjustable limit control is imposed. The amount of pressure imposed sets the force required to move the piston rod.

The other end of the rod, which passes into a separate chamber, has two diametrically opposed grooves cut into its longitudinal axis. These grooves start at a point away from the end and get progressively deeper as they approach the end.

One side of the control circuit previously mentioned is connected to the chamber into which this rod passes. If the rod is completely inserted into this chamber, no venting occurs via this path.

This would occur when pressure from the adjustable limit produces more force on the piston than is applied to the rod end from the drawbar.

As forces on the drawbar increase, the rod is pulled out and, consequently, the grooves, which get progressively larger, begin to allow venting from the control circuit back to the reservoir.

This venting does the same thing, as if the operator handle was moved to raise the plow. The servo valve is directed to supply fluid to the elevation control cylinder to raise the plow.

As the plow is raised, the forces on the drawbar decrease until a point of equilibrium is reached.

At this point; the force on the piston from the adjustable limit is matched to that applied to the rod.

The plow remains in this position until condidtions lower the drawbar pull even more, allowing the rod to be retracted even further. The plow is then lowered back to its pre-set level.

At no time does the operator have to raise or lower the plow during actual plowing operations.

FURTHER IMPROVEMENT

A further control may be provided responsive to tractor engine speed to elevate the plow if the engine slows down too much. This control may be provided as an alternative or supplement to the load sensor in the drawbar. The speed control may be driven by the engine pump, the engine fan, the engine governor, or other element whose speed is a function of engine speed, preferably an element whose speed is proportional, preferably directly proportional, to engine speed.

In lieu of a hydraulic load position feedback venting the servo valve motor in parallel with the manual control, the load sensor, and/or the speed sensor, a mechanical load position feedback may be provided to relocate the servo valve seats and cut off hydraulic flow to the load cylinder when the load reaches the desired position. At this time it may be noted that there are two fluid circuits, one controlled by the servo valve determining flow of hydraulic liquid to the load cylinder, and another controlled by the manual control, the load sensor and/or the speed sensor, for determining flow of fluid to the motor driving the servo valve. The two fluid circuits can be supplied from the same or different source. Restrictors in the lines from the supply to the control fluid lines convert the supply to a source of fluid under pressure having a drooping pressure versus flow characteristic.

BRIEF DESCRIPTION OF THE DRAWINGS

For a more detailed description of a preferred embodiment of the invention, reference will now be made to the accompanying drawings wherein.

ADDITIONAL DRAWING

Figure 2:
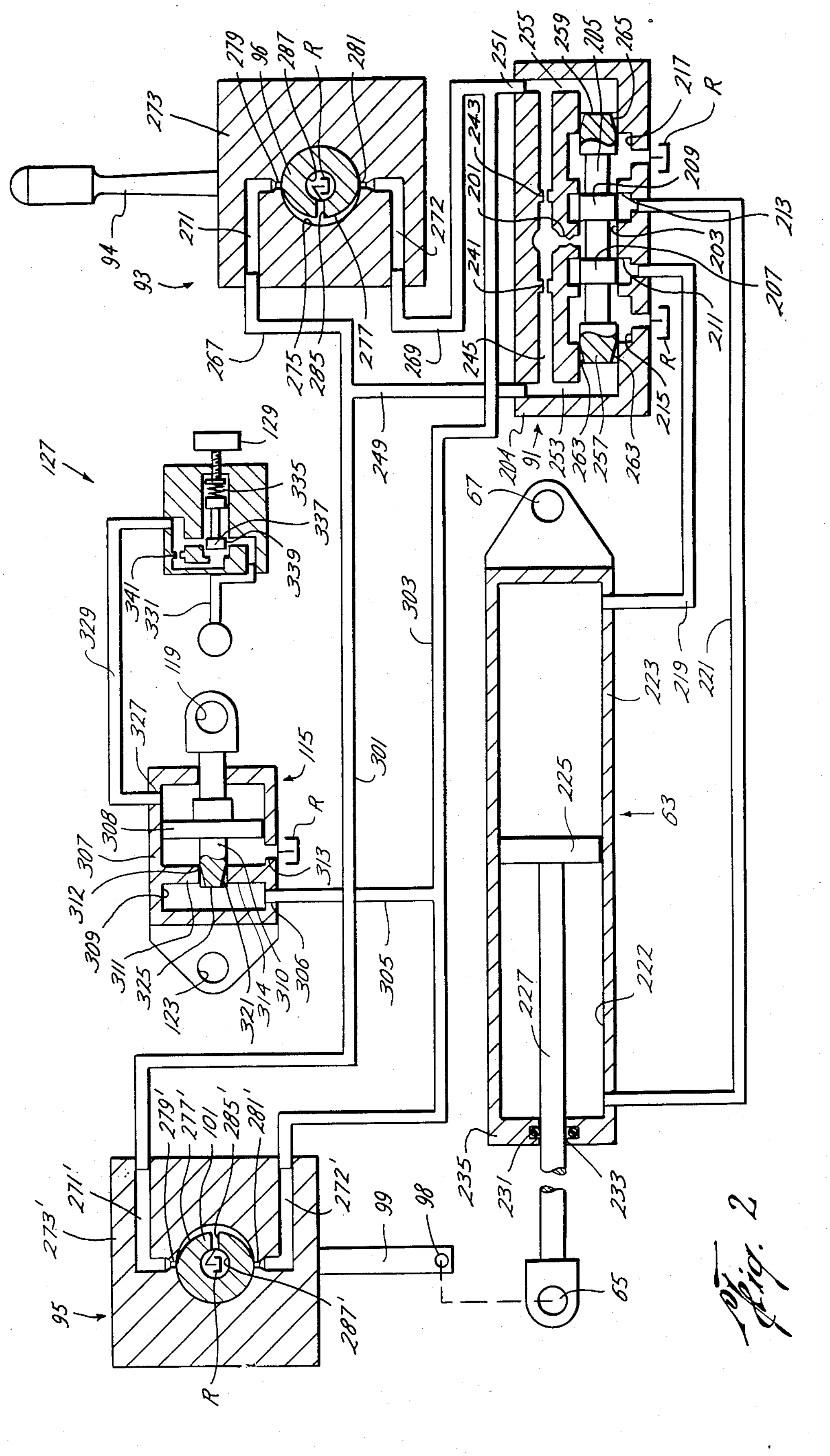
FIG. 2 is a semi schematic view of the hydraulic system of the invention.
Figure 5:
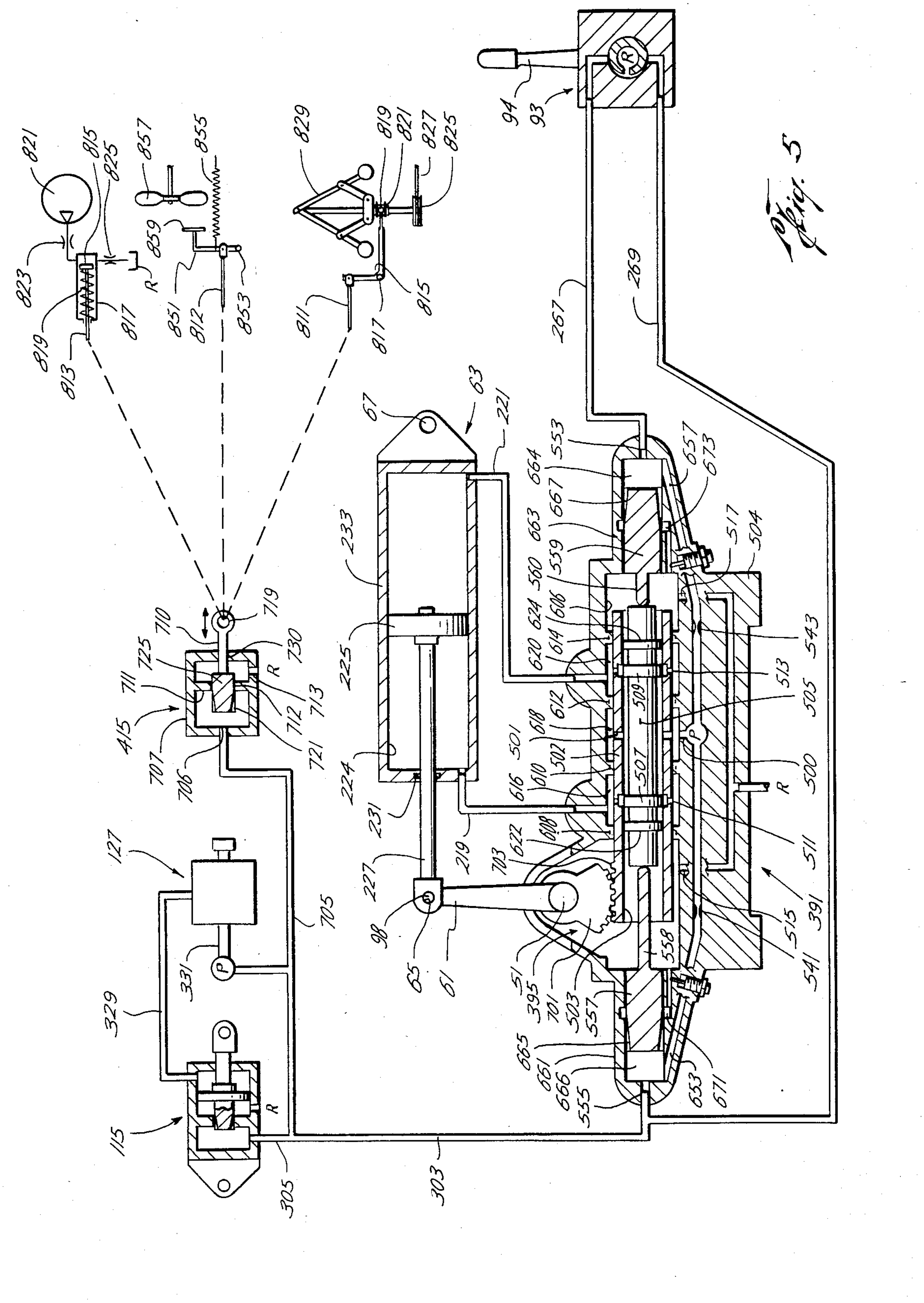

FIG. 5 is a semi-schematic view similar to FIG. 2 showing how the hydraulic system can be modified.

DESCRIPTION OF PREFERRED EMBODIMENTS

Towed Implement

Figures 1, 3, 4:
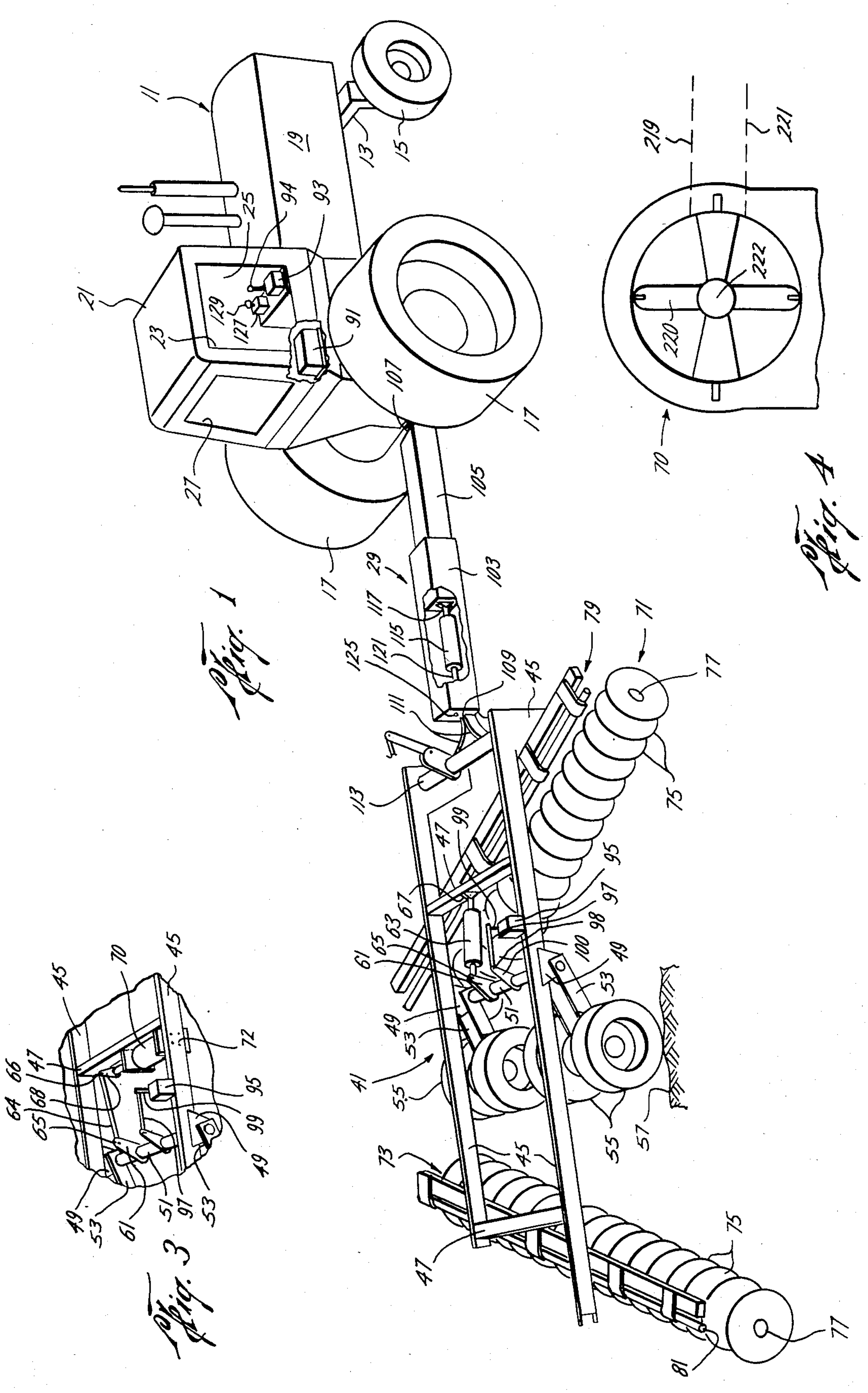
FIG. 1 is a pictorial view of a tractor and disc plow incorporating a manual and an automatic hydraulic elevation control system in accordance with the invention.
FIG. 3 is a fragmentary pictorial view of apparatus similar to that of FIG. 1 showing a modification employing a rotary actuator in place of a hydraulic cylinder.
FIG. 4 is a fragmentary semi-schematic of a hydraulic system similar to that of FIG. 2 showing a modification.

Referring now to FIG. 1, there is shown a tractor 11 comprising a chassis 13 supported by two small front wheels 15 (only one of which shows) and two large rear wheels 17. On top of the chassis is secured an internal combustion engine 19. Secured to the chassis to the rear of the engine is an operator's cab 21 having side windows 23, a windshield 25, and a rear window 27. Inside the cab but not shown are the usual controls for an automotive vehicle, comprising steering wheel, brakes, gear shift, clutch, throttle, ignition switch, starter, and lights. Connected to the rear of the chassis and extending therefrom between the rear wheels is drawbar means 29.

Connected to the rear of drawbar means 29 is a disc plow 41 comprising a chassis 43. Chassis 43 includes left and right side rails 45 and front and rear cross ties 47. Plates 49 welded to each side rail rotatably support the ends of a shaft 51. At the other end of each pair of arms is rotatably mounted a pair of wheels 55. According to the angle between the wheel arms 53 and the chassis, the chassis will be supported by wheels 55 at different elevations relative to the ground 57.

To adjust the wheel arm angle, shaft 51 is provided with a lever arm 61 rigidly secured thereto. Hydraulic cylinder 63 is pivotally connected to arm 61 at 65 and to cross tie 47 at 67. According to the extension or contraction of the cylinder, the wheel arm angle is adjusted to change the elevation of the chassis relative to the ground.

Alternatively, as shown in FIG. 3, arm 61 may be pivotally connected at 65 to connecting rod 64 which is pivotally connected at 66 to crank shaft 68 of rotary hydraulic motor 70 bolted to side rail 45 at 72. Motor 70 is shown in more detail in FIG. 4 discussed later on.

Referring once more to FIG. 1, secured to the underside of plow chassis 43 at the front and rear ends thereof, in front of and behind shaft 51, by conventional means (not shown), are rows 71, 73 of plow discs 75. Each row of discs is mounted on a shaft 77 which is carried (by conventional means not shown) by pairs 79, 81 of support bars. The angle on a horizontal plane between each shaft 77 and the longitudinal axis of chassis 43 is determined by the connection between support bars 77, 79 and the chassis, and such connection may be fixed or adjustable (by means not shown) as desired.

The elevation of discs 75 relative to the ground is determined by the elevation of the chassis which is adjusted by hydraulic cylinder 63, or hydraulic rotary motor 70 (FIG. 3). A servo valve 91 for controlling the supply and exhaust of hydraulic fluid to hydraulic cylinder 63, or motor 70 is mounted in cab 21. According to the invention servo valve 91 is manually controlled by a transmitter or vent valve 93 also mounted in the cab and by a feedback or vent valve 95. Valve 93 is actuated by hand lever 94 connected to its rotor 96 (see also FIG. 2). Valve 95 is connected to and actuated by shaft 51. Feedback 95 is connected to shaft 51 by connecting rod 97 which is pivotally connected at one end, at 98, to crank arm 100 affixed to shaft 51 and at the other end to operating lever 99 affixed to the rotor 101 (see also FIG. 2) of feedback valve 95.

Drawbar 29 includes telescoping square cross section tube 103 and bar 105. One end of tube 105 is rigidly connected at 107 to the rear of tractor 11. One end of tube 107 is rigidly connected at 109 to bars 111 secured to shaft 113 rotatably mounted at its ends in side rails 45.

Within tube 103 is disposed a load sensor 115 (see also FIG. 2). A rod 117 pivotally connected at 119 to the sensor is affixed at its other end to the end of bar 105. A rod 121 pivotally connected at 123 to the sensor is affixed at its other end to the closed end 125 of tube 103. Sensor 115 therefore transmits tension and compression between bar 105 and tube 103.

A manually adjustable pressure regulating valve 127 (see also FIG. 2) is mounted in the tractor cab. Valve 127 is adjustable by means of knob 129. The valve is connected to load sensor 115 as shown in FIG. 2.

Hydraulic Circuit

Referring now to FIG. 2, there is shown the hydraulic circuit connecting transmitter vent valve 93, servo valve 91, hydraulic cylinder 63, feedback vent valve 95, load sensor valve 115, and adjustable pressure regulating valve 127.

(i) Servo Valve and Hydraulic Motor

A source P of hydraulic fluid (liquid) under pressure connects via port 201 to the cylindrical bore 203 in body 204 of servo spool valve 91. Valve core 205 has cylindrical lands 207, 209 controlling flow of fluid between valve body ports 211, 213 and high pressure port 201 and between ports 211, 213 and exhaust ports 215, 217 in the valve body. Exhaust Ports 215, 217 connect to reservoir R of hydraulic fluid at atmospheric pressure. Pressure ports 211, 213 connect via fluid conduits 219, 221 to opposite ends of body 223 of hydraulic cylinder or linear motor 63.

Within the cylindric bore 224 of cylinder body 223 cylindrical piston 225 moves axially to the left or the right or remains atationary according to whether valve 91 connects conduits 219, 221 to source P or reservoir R or leaves the conduits blocked. Piston rod 227 connected to piston 225 extends through O-ring 231 around an aperture 233 in end wall 234 of cylinder body 223 and is pivotally connected at 65 to wheel elevation control lever 61.

In the modification shown in FIG. 4, conduits 219, 221 connect to opposite sides of diametral wall 216 extending axially of the cylindrical bore of cylinder body 220 of a rotary motor 70 having a diametral rotary piston or rotor 220 mounted therein on rotatably mounted shaft 222. Rotor 220 turns to the left or right or remains stationary according to whether valve 91 connects conduits 219, 221 to source P or reservoir R or leaves the conduits blocked, analogous to the movement of piston 225 in the FIGURE L embodiment. Rotor 220 turns shaft 222. Crank shaft 68 is affixed to shaft 222 and is connected to elevation control lever 61 as previously described with references to FIG. 3.

(ii) Pressure Control of Servo Valve; Valve Feedback

Referring again to FIG. 2, source P is connected through flow restricting orifices 241, 243 and flow passages 245, 247 to a pair of conduits 249, 251. Conduits 249, 251 are connected to flow passages 253, 255 in valve body 204 leading to the ends of bore 203 of servo valve 91, thereby to apply the pressure of conduits 249, 251 to pistons 257, 259 on the ends of valve core 205 and hence control the position of core 205. Should the pressure in either conduit 249, 251 exceed that in the other, e.g. because transmitter 93 is positioned to vent one of the conduits more than the other, valve core 205 will move axially until the pressure balance is restored, e.g. by opposite venting via feedback valve 95.

Core 203 is provided with negative feedback tapered grooves 263, 265 in pistons 257, 259 to reservoir R. These grooves are positioned so as normally both to be fully blocked, or nearly so, and to open increasingly at the piston end having the higher pressure as it moves toward the center of the valve body. The tapered grooves have cross sections of similar shape but linearly increasing area relative to the axial position of the cross section, as explained in the patent incorporated herein by reference. When the venting of lines 249 and 251 is otherwise equal, grooves 263, 265 will vent one line more than the other creating a pressure difference which acts to centralize core 205 so as to block off flow through conduits 219, 221. When the core is centralized, venting via grooves 263, 265 ceases (or is equalized) and the pressure differential disappears and the core comes to rest. Although as shown both grooves are blocked when the core is in mid position, they could both be slightly unblocked or even half open when the valve is in mid position, in which case negative feedback would be applied to both conduits whenever the core was displaced. It would be undesirable to position the grooves so that any substantial departure from mid-position would be required before either groove opened, for then the core would not recenter properly.

(iii) Transmitter

Pressure in one or the other (or both) of conduits 249, 251 can be lowered by venting it through transmitter valve 93 connected thereto by conduits 267, 269.

Valve 93 includes a valve body 273 having a cylindrical bore 275 within which is rotatably mounted a generally cylindrical valve core 96. Core 96 has an undercut eccentric cylindric surface or land 277 of about 180 degrees extent so as to span the valve bore between nozzles 279, 281 when the core is in neutral position, as shown in FIG. 2, extending from about the center of one nozzle to the center of the other. Nozzles 279, 281 connect via flow passages 271, 273 with conduits 267, 269.

If desired, land 277 can be of greater or lesser extent, e.g. if of lesser extent it may extend just to the near edge of each nozzle so as to leave each fully closed when the core is in mid-position, or it may have an even lesser extent so as to leave a deadband at each side of mid-position in which deadbands both nozzles remain closed. As shown however, both nozzles are slightly open when the valve core is in mid-position. When core 96 is turned in either direction, one nozzle becomes (or remains fully blocked) and the other gradually opens wider.

Fluid vented from conduit 249 or 251 or both via one or both nozzles 279, 281 flows into the valve bore 275 and over the surface of land 277 into exhaust port 285 and thence through axial passage 287 in the core to reservoir R. Similar suitable transmitter construction is shown in more detail in the prior patent incorporated herein by reference, wherein is shown a mode of rotatably mounting core 96 in body 273 and sealing the core ends and connecting the core to manual operator or handle 94.

If desired, the extent of undercut 277 may be such that both nozzles 279, 281 remain open at all times, one being further opened and the other closed somewhat as core 96 is turned, thereby to increase the venting of one of conduits 249, 251 and decrease the venting of the other as the core is turned about its axis, but with both conduits 249, 251 vented to some extent at all times and equally when the core is in mid-position, as explained in more detail in the prior patent incorporated herein by reference.

(iv) Load Feedback

One or the other (or both) of conduits 249, 251 can also be vented by feedback valve 95 connected thereto by conduits 301, 303. As shown, if the transmitter vents one of conduits 249, 251, the resulting movement of wheel elevation control shaft 51 will cause feedback valve 95 to vent the other of conduits 249, 251, thereby tending to eliminate the pressure differential acting on servo valve 91. The construction of valve 95 is the same as that of valve 93 so that like parts are given like reference numbers primed and the description is not repeated. Although the construction of valve 95 can be varied in the same way as valve 93, as set forth above, to provide slight or zero venting at neutral position, or to provide deadbands, or to provide dual variable venting, preferably the constructions of valve 95 and valve 93 should be the same so that the effect of the angular movement of one will be offset by an equal angular movement of the other.

(v) Load Sensor Valve

Conduit 251 can also be venting by load sensor valve 115 via branch conduit 305 connected to conduit 303. Load sensor valve 115 includes body 307 having a cylindrical bore 309 and a port 306 connecting branch conduit 305 thereto. Within bore 309 is axially slidable cylindrical piston 308 affixed to cylindrical valve core 310. Core 310 is axially slidable in cylindrical bore 312 in partition wall 314 dividing bore 309. When core 361 is in the position shown it blocks flow through bore 312 from branch conduit 305 to exhaust port 313 in body 307, port 313 being connected to reservoir R; but when core 310 moves to the right past port 313, tapered grooves 321, (similar to feedback grooves 263, 265 are uncovered increasingly as the core moves to the right, permitting such fluid flow to vent conduit 249.

The pressure of fluid in conduit 249 transmitted to end 325 of valve core 310 tends to open the valve, and the force of said pressure is assisted by the tension in drawbar 29 transmitted to the load sensor via connections 123, 119. The sum of the latter forces is opposed by the force of pressure fluid on the right of piston 308 admitted to bore 309 via body port 327. Port 327 is connected by conduit 329 and adjustable pressure regulating valve 127 to conduit 331 leading to source P of pressurized hydraulic fluid. When the force on the load sensor (added to the force of pressure fluid on end 325 of the valve core) exceeds that on the right of piston 308 from port 327, core 310 moves to the right, venting conduit 249. The farther core 310 moves, the more it opens as tapered grooves move to the right and then larger cross-sections are uncovered, thereby dropping the pressure on end face 325 of the valve core and reducing the force tending to open the valve farther; however, the force on the load sensor may be so great as to open the valve fully regardless of such negative feedback on end face 325. When the combined force of the lead sensor and the pressure fluid on end face 325 drops below the force of the pressure fluid on the right of piston 308 from port 329, the piston will move to the left and close valve 115.

According to the selected dimensions of the valve core, the negative feedback grooves in the valve core, the setting of the pressure of the pressure fluid, and the magnitude of the load on the sensor, the load sensor can be made to act to gradually raise and lower the towed tool in response to changes in drawbar tension or can be made to have no effect until a certain drawbar tension is reached whereupon the tool is raised fully as far as it will go until the tension drops below the set valve whereupon the tool is immediately lowered all the way to its previously chosen elevation.

Pressure regulating valve 127 may be of any conventional type. For example, as shown in FIG. 2, spring 335, whose degree of compression is adjusted by thumb screw 129, tends to urge valve core 337 to the left to uncover port 339 to allow more fluid to flow from source P to conduit 329. But fluid pressure from conduit 329 acting through flow restrictor 341 on the opposite side of valve core 337 from spring 335, moves core 337 to the right and closes port 339 if the pressure is too high. Other forms of regulating valve may be employed to maintain any desired constant adjustable pressure downstream of the valve.

Recapitulation

From the foregoing description, it will be apparent that movement of manual operator 94 of the transmitter valve will cause change in elevation of the towed implement in proportion, the change being discontinued when the load feedback valve venting equals that of the transmitter valve and the servo valve moves to mid-position under the influence of the pressure differential due to its own negative feedback venting, which brings the pressure in conduits 249 and 251 back to equality. As described in the aforementioned patent incorporated herein by reference, to take account of the different lengths of the conduits connecting the feedback with P and R compared to the lengths of the conduits connecting control valve 93 with P and R, means such as manually adjustable flow restrictors 401, 403, 405, may be provided in conduits 267, 269, and the connection of port 285 to R. The result is that a preselected angular movement of handle 94 causes a like angular movement of crank arm 61 that controls wheel elevation, and the positioning of the crank arm 61 is precisely repeatable when handle 94 is moved away from a desired position and back again, as when it is desired to lift a plow when crossing a road and then returning it to its original elevation.

FURTHER MODIFICATIONS

Referring now to FIG. 5, there is shown a hydraulic circuit generally similar to that of FIG. 2 and wherein like parts are given like numbers and similar parts are given like numbers increased by 300. Only the points of difference need be described in detail. A common supply P of fluid under pressure is used both for control and motive power.

System

There is shown transmitter vent valve 93, servo valve 391, hydraulic cylinder 63, mechanical feedback valve seat positioning means 395, load sensor valve 115, adjustable pressure regulating valve 127, and speed responsive valve 415.

Servo Valve

Source P of hydraulic fluid (liquid) under pressure connects via port 500 in body 504 and port 501 in sleeve 502 to the cylindrical bore 503. Valve core 505 has cylindrical lands 507, 509 controlling flow of fluid between sleeve ports 511, 513 and high pressure port 501 and exhaust ports 515, 517 in the valve body. Exhaust ports 515, 517 connect to reservoir R of hydraulic fluid at atmospheric pressure. Pressure ports 511, 513 connect via fluid conduits 219, 221 to opposite end of body 223 of hydraulic linear motor 63.

Movable Seat Sleeve

Valve seat sleeve 502 is received coaxially within generally cylindrical cavity 606 in valve body 504 and is held in radially spaced relationship relative thereto by a plurality of annular bearing flanges 608, 610, 612, 614 whereby the sleeve can move axially and whereby there are formed between the sleeve and body a plurality of axially extending annular channels 616, 618, 620. These channels maintain fluid communication between ports 501 and 201 and between ports 511, 513 and conduits 219, 221 respectively regardless of the relative axial positions of the sleeve and body within the range of possible relative axial motion therebetween.

Sleeve Guides

It is also to be noted that in addition to closure lands 507, 509, valve core 505 is provided with guide lands 622, 624 which fit loosely within sleeve 502 to help center the core in the sleeve and provide means supporting the core for axial movement within the sleeve. However, these guide lands do not seal with the sleeve, therefore hydraulic fluid can flow therepast.

Sleeve End Clearance Passages

Sleeve 502 is shorter than cavity 606 within the valve body, to allow relative axial motion therebetween and always to leave room for fluid passage through the open ends of the sleeve, so that exhaust ports 515, 517 are always in communication with the interior of the sleeve adjacent the outer sides of valve closure lands 507, 509, thereby to communicate with whichever of sleeve ports 511, 513 is uncovered to exhaust one end or the other of cylinder body 223 of linear motor 631 (or rotary motor 70 if the FIG. 4 motor is employed instead of linear motor 63).

Hydraulic Cylinder Operation

Thus, similar to the FIG. 3 embodiment, within the cylindric bore 224 of cylinder body 223, cylindrical piston 225 moves axially to the left or the right or remains stationary according to whether valve 391 connects conduits 219, 221 to source P or leaves the conduits blocked.

Piston rod 227 connected to piston 225 extends through O-ring 231 around an aperture in the end wall of cylinder body 235 and is pivotally connected at 65 to lever 61 affixed to shaft 51, as shown in FIG. 1. Or if a rotary motor such as 76 is employed, rotor shaft 222 will be turned and through crank shaft 68 and connecting rod 64 will move lever 61 as previously described with reference to FIG. 3.

Servo Motor

Referring again to FIG. 5, source P (or an alternative source if desired) is connected through flow restricting orifices 541, 543 and flow passages 653, 657 leading to the ends of servo cylinders 661, 663 formed at the ends of servo valve body 204, thereby to apply the pressure of conduits 267, 269 to the ends of cylindrical pistons 557, 559. Pistons 557 and 559 are axially slidable in cylinders 661, 663. Piston rods 558, 560 integral with the inner ends of pistons 557, 559 have rounded ends (spheric or cylindric) to make point or line contact with the ends of valve core 505 and control the position of core 505. Should the pressure in either conduit 267, 269 exceed the other, e.g. as might be caused by movement of manual vent valve 94 or load sensor valve 115, valve core 505 will move axially until the pressure balance is restored, by opposite venting via the valve feedback next to be described.

Servo Motor Fluid Negative Feedback

Servo pistons 557, 559 are each provided with a plurality of feedback tapered grooves 665, 667 for variably venting the high pressure at spaces 664, 666 in cylinders 661, 663 through 671, 673, the ends of cylindrical bore 666 of the valve body, and exhaust ports 515, 517. These grooves are positioned so as to be fully blocked, or nearly so, when the valve is in neutral position and to open increasingly at the motor piston having the higher pressure as it moves toward the center of the valve body. These grooves are shaped, constructed, and positioned and function like grooves 263, 265 previously described, with one exception, which is that there is no cooperating venting feedback from the hydraulic cylinder such as is provided by load feedback valve 95 in the FIG. 2 construction. It may be noted here that load feedback refers to the load on hydraulic cylinder 63, not to drawbar tension or tractor engine load.

Hydraulic Cylinder Mechanical Negative Feedback

Instead, in the FIG. 5 construction mechanical negative feedback means 395 from hydraulic cylinder 63 is provided. Feedback means 395 includes gear sector 701 secured to shaft 151 and engaging a rack 703 secured to or formed on valve seat sleeve 502. It will be understood that shaft 51 extends through a sealed aperture in the side of valve body 504 whereby bydraulic fluid in the body will not leak out. Lever 61 is attached to shaft 51 outside of valve body 504 so there is no need to provide a slot in the valve body to accommodate motion of the lever.

If transmitter 94 vents one or the other of conduits 267, 269, the resulting movement of implement elevation control shaft 51 will cause sector 701 to drive rack 703, repositioning valve seat sleeve 502 in a direction toward closing off whichever of ports 511, 513 had been opened in response to movement of transmitter 93. Motion of sleeve 502 will continue as implement elevation changes until port 511 or 513 is fully closed; then the change in elevation of the implement will cease.

It is to be noted that the motion of valve core 505 will be determined by the extent of motion of transmitter 93, for the greater the motion of the transmitter, the greater the pressure differential across lines 267, 269 and the farther the core will have to move in response to motion of pistons 557, 559 before the relevant one or both of the fluid feedback grooves 665, 667 will be uncovered sufficiently to bring the fluid pressures on pistons 557, 559 back into balance. And the farther the core moves, the farther the valve seat sleeve will have to move to cut off hydraulic fluid to cylinder 63. The extent of up or down movement of the towed implement is thus a function of the extent of movement of transmitter 93. If the transmitter venting and piston venting are linear functions of thus movements, then, since the mechanical feedback is also linear, the implement motion will be a linear function of, i.e. directly proportional to, transmitter angular displacement.

Tractor Load Control

Drawbar tension sensor valve 115 and associated pressure regulating valve 127 will operate the same in the FIG. 5 construction as in the FIG. 2 construction except that vent line 303 connects to servo motor cylinder 661 to act on separate piston 557 instead of to the cylindrical bore in which moves integral servo motor piston 259. Also source P in FIG. 5 feeds directly to valve inlet line 305 without going through a flow restrictor.

Engine Speed Control Valve

Engine speed control valve 415 is like load sensor valve 115 except that piston 308 (see FIG. 2) and pressure fluid line 329 are omitted. Valve 415 includes a cylinder 707 divided by a wall 711 having a port 712 therethrough. Cylindrical valve closure plug 725 extending through port 712 has one or more tapered grooves 721 in its outer periphery. Valve inlet line 705 connects source of pressure fluid P to valve inlet 706. Valve outlet port 713 connects to fluid sump to reservoir R. Valve stem 710 extends through guide port in the end of valve body cylinder 707, terminating in an eye 719.

Speed Control Valve Actuation

Eye 719 may be connected to any one of links 811, 812, 813 for actuation of valve 415. Link 811 is pivotally connected to one end of bell crank 815, pivotally mounted at 817, the other end of the bell crank being pivotally yoked at 819 to sleeve 821 sliding up and down on governor shaft 823. Shaft 823 is driven by pulley 825 and belt 827 from tractor engine 19 so that its speed is directly proportional to engine speed. Flyball governor 829 connected to sleeve 821 causes it to move up and down shaft 823 as engine speed varies. Thus, the position of valve plug 725 in port 712 depends on engine speed; the greater the speed the greater the venting produced by valve 415. Normally such venting will be slight and the effect on implement elevation will be minimal. Also, once the tractor is in operation its speed will be fairly constant and so will be the engine speed, so that speed changes will not be influencing implement elevation. However, should the engine slow down markedly due to improper engine function or excessive drawbar load, enough venting will occur at 415 to cause the implement to be raised enough to unload the tractor and its engine.

Instead of connecting valve 415 to tractor engine driven governor 829, link 812 may be employed. Link 812 is pivotally connected to lever 851. Lever 851 is pivotally mounted to the tractor chassis at 853 and braced by spring 855 toward engine driven fan 857. Vane 859 on lever 851 receives air flow from the fan and tends to turn lever 851 away from the fan as fan speed and air flow increase. Thus, movement of link 812 is a direct, though non-linear, function of engine speed, and the system works similarly to the system employing link 811 and the engine driven governor.

Alternatively, link 813 may be employed. Link 813 is connected to piston 815 moving in cylinder 817. Spring 819 urges the piston to the right. Engine driven pump 821 is connected through manually variable valve 823 to cylinder 817, supplying fluid to move piston 815 to the left in opposition to the spring. Cylinder 815 is vented to a reservoir R via manually adjustable valve 825. Thus the position of link 813 is a function of engine speed, the precise function depending on pump characteristics, spring constant, and adjustment of valves 823, 825. The general operation is the same as that with link 811 or 812.

It will be understood that draw bar tension control means 115, 127 and engine speed control means 415 may be used together or either one alone.

I claim:

1. Automotive apparatus comprising
a tractor,
a towed implement including a tool,
connection means connecting the implement to the tractor,
height adjusting means including hydraulic motor means for adjusting the elevation of the tool relative to the earth's surface,
a source of hydraulic fluid under pressure,
a reservoir,
valve means for selectively connecting the motor means to the source and reservoir, and in a neutral position, to disconnect the motor means from both the source and the reservoir,
operator controlled means carried by the tractor for changing the position of said valve means to effect raising and lowering of said tool, and
feedback means responsive to the elevation of the tool,
characterized by the fact that said operator controlled means includes:
hydraulic line means having a drooping pressure versus flow characteristic,
motive means responsive to the pressure in said line means for actuating the valve means,
said feedback means
restoring the valve means to neutral position when the tool has reached a position determined by the setting of the operator controlled valve means,
said feedback means being negative feedback vent means connected to the tool for varying the pressure of said line means, upon movement of the tool in response to movement of the operator controlled valve means, to negate the effect of the change of the pressure of said line means caused by the operator controlled valve means,
said hydraulic motor means being double acting, being adapted to receive in its entirety pressure fluid from said source and to deliver from its entirety fluid to said reservoir to move the hydraulic motor means positively in both one direction and another according to the position of the valve means to effect raising and lowering of the tool,
said height adjusting means providing for setting the elevation of the tool in various operative positions relative to the ground and in a higher inoperative position.

2. Apparatus according to claim 1,
said connection means including load sensor means responsive to tension in the connection means for for changing the level of said tool,
said apparatus being further characterized by said load sensor means being ineffective to change the level of said tool when the tension in the connection means is below a certain value, whereby the tool remains at a constant elevation corresponding to the setting of said operator controlled means during all values of said tension below said certain value, said load sensor means varying the pressure of said line means to elevate said tool to inoperative position where the tension in the connector means rises from below said certain value to above certain value.

3. Apparatus according to claim 2,
said height adjusting means holding said tool in inoperative position as long as said tension in the connection means is above said certain value,
said load sensor means varying the pressure of said line means to lower the tool to the elevation corresponding to the setting at said operator controlled means when the tension in the connection means drops from above said certain value to below said value.

4. Apparatus to claim 2, the load sensor means including: a valve for venting said line means responsive to tension in the connection means tending to open the valve, fluid pressure means tending to close the valve, and adjustment means carried by the tractor for adjusting the pressure of said fluid pressure means, thereby to adjust the aforementioned certain value at which the load sensor means is actuated to positively increase the elevation of the tool to said inoperative position.

5. Apparatus according to claim 4, said connection means including telescopic bar and tube members connected one to the tractor and one to the implement, said load sensor means with its valve for venting the line means being disposed within said tube and connected at one end to said bar and at its other end to said tube.

6. Automotive apparatus comprising a tractor, a towed implement including a tool, connection means connecting the implement to the tractor, means including a hydraulic motor for adjusting the elevation of the tool relative to the earth's surface, a source of hydraulic fluid under pressure, a reservoir, valve means for selectively connecting the motor to the source and reservoir, hydraulic line means having a drooping pressure versus flow characteristic, motive means responsive to the pressure in said line means for actuating the valve means, operator controlled vent means carried by the tractor for varying the pressure in said line means, negative feedback vent means connected to the tool for varying the pressure of said line means, upon movement of the tool in response to movement of the operator controlled vent means, to negate the effect of the change of the pressure of said line means caused by the operator controlled vent means, said connection means including load sensor means responsive to tension in the connection means for varying the pressure of said line means to elevate said tool when the tension in the connection means rises from below a certain value to above said value, said connection means comprising one member connected to the tractor and another member connected to the implement, said load sensor means comprising a body having a cylindrical cavity, said body being connected to one of said members, a cylindrical piston axially slidably movable in said cavity, a piston rod extending through and axially slidable in an aperture in an end wall of said body in fluid tight relationship therewith and connecting at one end to said piston and its other end with said another of said members of the connection means, fluid pressure means for supplying pressurized fluid at selected pressure to the piston on the same side thereof as said piston rod is connected, a wall transverse to the axis of said body disposed on the side of the piston opposite to said piston rod dividing the cavity into a space adjacent the piston and an end space, port means in the body connecting the cavity space adjacent the piston to said reservoir, port means in the body connecting said end space with said line means, and valve core means extending into and axially slidable within a port in said wall and connected at one end to said piston on the opposite end of the piston rod, said valve core means having tapered groove means in the portion thereof adapted to be within said wall port, said groove means being of increasing cross-sectional area progressing in the direction toward said piston.

7. Apparatus according to claim 6, said load sensor means varying the pressure of said line means to lower the tool when the tension in the connection means drops from above said certain value to below said value.

8. Automotive apparatus comprising a tractor, a towed implement including a tool, connection means connecting the implement to the tractor, means including a hydraulic motor for adjusting the elevation of the tool relative to the earth's surface, a source of hydraulic fluid under pressure, a reservoir, valve means for selectively connecting the motor to the source and reservoir, hydraulic line means having a drooping pressure versus flow characteristic, motive means responsive to the pressure in said line means for actuating the valve means, operator controlled vent means carried by the tractor for varying the pressure in said line means, negative feedback vent means connected to the tool for varying the pressure of said line means, upon movement of the tool in response to movement of the operator controlled vent means, to negate the effect of the change of the pressure of said line means caused by the operator controlled vent means, wherein said operator controlled vent means and said feedback means connected to the tool are of like construction, each including a vent valve having a body with a cylindrical bore and diametrically opposed nozzle ports in the body and a generally cylindrical rotor rotatably mounted concentric with said bore and having an undercut eccentric cylindric land extending between said ports when the vent valve is in closed position, the space between said bore and said land being connected to the reservoir.

9. Apparatus according to claim 8, said valve means and motive means both being carried by the tractor, said operator controlled vent means including first conduit means connected to said line means, said negative feedback vent means including second conduit means connected to said line means, said conduit means including means for balancing the flow resistance of the first conduit means with the flow resistance of the second conduit means.

10. Apparatus according to claim 8, including second negative feedback means connected to said valve means for venting said line means in a manner tending to return the valve means to a position in which the motor is connected to neither the source nor reservoir, thereby bringing the tool to rest as far as elevation is concerned.

11. Apparatus according to claim 8, said land extending 180 degrees from the center of one said nozzle port to the other when the vent valve is in closed position.

12. Apparatus according to claim 8, said land extending over 180 degrees beyond said nozzle ports when said vent valve is in closed position.

13. Apparatus according to claim 8, said land extending less than 180 degrees between said nozzle ports leaving both of said ports fully blocked by said core means when said vent valve is in closed position.

14. Apparatus according to claim 8, said hydraulic motor being a rotary motor moving angularly equally to the angular movement of said operator controlled vent means.

15. Apparatus according to claim 8, said means including a hydraulic motor for adjusting the elevation of the tool including a crank arm, said hydraulic motor being a linear motor connected to the crank arm which moves angularly equally as the angular movement of said operator controlled vent means.

16. Apparatus according to claim 8, said connection means including load sensor means responsive to tension in the connection means for varying the pressure of said line means to elevate said tool when the tension in the connection means rises from below a certain value to above said value.

17. Apparatus according to claim 16, said connection means including telescopic bar and tube members connected one to the tractor and one to the implement, said load sensor means being disposed within said tube and connected at one end to said bar and at its other end to said tube.

18. Apparatus according to claim 16, said load sensor means varying the pressure of said line means to lower the tool when the tension in the connection means drops from above said certain value to below said value.

19. Automotive apparatus comprising a tractor driven by an engine, a towed implement including a tool, connection means connecting said implement to the tractor, hydraulic positioning means carried by the tractor for raising and lowering the tool, a hydraulic liquid supply for said positioning means, servo valve means for directing the positioning means, by controlling said hydraulic liquid supply to the positioning means, said servo valve means including valve means for controlling said hydraulic liquid to said positioning means and piston-cylinder means for controlling the hydraulic liquid controlling valve means, a fluid supply for said piston-cylinder means having a drooping pressure versus flow characteristic, manual means carried by the tractor for actuating the servo means by appropriate setting of the manual means, tension responsive means carried by the connection means for actuating the servo means to direct the positioning means to elevate the tool upon tension in the connection means in excess of a preselected amount, speed responsive means responsive to the rotational speed of the engine to direct the positioning means to elevate the tool upon engine rotational speed in excess of a preselected amount, said manual, tension responsive, and speed responsive means each including a flow path for venting said fluid supply to the piston-cylinder means and a variable restrictor for the respective flow path responsive respectively to setting of the manual means, tension of the connection means, and engine speed, for varying such venting, and feedback means responsive to the elevation of the implement for deactivating the servo means to maintain the tool at an elevation determined by the setting of said manual means except upon occurrence at least one of said tension and speed in excess of the respective preselected amount.

20. Apparatus according to claim 19, in which said feedback means also includes a flow path for venting said fluid supply to the piston-cylinder means and a variable restrictor responsive to tool elevation for changing said venting for the respective flow path.

21. Apparatus according to claim 19, in which said feedback means includes a sleeve valve for deactivating the servo means by cutting off said hydraulic liquid supply from said positioning means.

22. Automotive apparatus comprising a tractor, a towed implement including a tool, connection means connecting the implement to the tractor, height adjusting means including hydraulic motor means for adjusting the elevation of the tool relative to the earth's surface, a source of hydraulic fluid under pressure, a reservoir, valve means for selectively connecting the motor means to the source and reservoir and in a neutral position to disconnect the motor means from both the source and the reservoir, operator controlled means carried by the tractor for changing the position of said valve means to effect raising and lowering of said tool, feedback means responsive to the elevation of the tool for restoring the valve means to neutral position when the tool has reached a position determined by the setting of the operator controlling the valve means, characterized by the fact that said operator controlled means includes:

hydraulic line means having a drooping pressure versus flow characteristic, motive means responsive to the pressure in said line means for actuating the valve means, said feedback means being negative feedback means connected to the tool for actuating the valve means upon movement of the tool in response to movement of the operator controlled valve means, to negate the effect on the valve means of the change of the pressure of said line means caused by the operator controlled valve means, said hydraulic motor means being double acting, being adapted to receive in its entirety pressure fluid from said source and to deliver from its entirety fluid to said reservoir to move the hydraulic motor means positively in both one direction and another according to the position of the valve means to effect raising and lowering of the tool.

23. Apparatus according to claim 22, said valve means and motive means both being carried by the tractor, said operator controlled valve means including first conduit means connected to said hydraulic line means, said valve means including a movable valve core member and a movable valve seat member, said motive means acting on one of said valve members and said feedback means acting on the other of said valve members.

24. Apparatus according to claim 22 or 23, including second negative feedback means connected to said valve means for venting said line means in a manner tending to return the valve means to a position in which the motor is connected to neither the source nor reservoir, thereby bringing the tool to rest as far as elevation is concerned.

25. Apparatus according to claim, 24 said means including a hydraulic motor for adjusting the elevation of the tool including a crank arm, said hydraulic motor being a linear motor connected to the crank arm which moves angularly equally as the angular movement of said operator controlled valve means.

26. Automotive apparatus comprising a tractor, a towed implement including a tool, connection means connecting the implement to the tractor, means including a hydraulic motor for adjusting the elevation of the tool relative to the earth's surface, a source of hydraulic fluid under pressure, a reservoir, valve means for selectively connecting the motor to the source and reservoir, hydraulic line means having a drooping pressure versus flow characteristic, motive means responsive to the pressure in said line means for actuating the valve means, operator controlled vent means carried by the tractor for varying the pressure in said line means, negative feedback means connected to the tool for actuating the valve means upon movement of the tool in response to movement of the operator controlled vent means, to negate the effect on the valve means of the change of the pressure of said line means caused by the operator controlled vent means, said connection means including load sensor means responsive to tension in the connection means for varying the pressure of said line means to elevate said tool when the tension in the connection means rises from below a certain value to above said value, said connection means comprising one member connected to the tractor and another member connected to the implement, said load sensor means comprising a body having a cylindrical cavity, said body being connected to one of said members, a cylindrical piston axially slidably movable in said cavity, a piston rod extending through and axially slidable in an aperture in an end wall of said body in fluid tight relationship therewith and connecting at one end to said piston and its other end with said another of said members of the connection means, fluid pressure means for supplying pressurized fluid at selected pressure to the piston on the same side thereof as said piston rod is connected, a wall transverse to the body axis disposed on the side of the piston opposite to said piston rod dividing the cavity into a space adjacent the piston and an end space, port means in the body connecting the cavity space adjacent the piston to said reservoir, port means in the body connecting said end space with said line means, and valve core means extending into and axially slidable within a port in said wall and connected at one end to said piston on the opposite end of the piston rod, said valve core means having tapered groove means in the portion thereof adapted to be within said wall port, said groove means being of increasing cross-sectional area progressing in the direction toward said piston.

27. Apparatus according to claim 26, said load sensor means varying the pressure of said line means to lower the tool when the tension in the connection means drops from above said certain value to below said value.

* * * * *